H. Carver,
Bench Plane.
No. 7543.
Patented Aug 6. 1850.

UNITED STATES PATENT OFFICE.

HIRAM CARVER, OF EDINBURG, VIRGINIA.

SCRAPER USED BY CABINETMAKERS.

Specification of Letters Patent No. 7,543, dated August 6, 1850.

*To all whom it may concern:*

Be it known that I, HIRAM CARVER, of Edinburg, county of Shenandoah, and State of Virginia, have invented a new and useful Improvement in Cabinetmakers' Scraping-Tools, and that the following is a full, clear, and exact description thereof, reference being had to the accompanying drawings, which make part of this specification.

The scraper in common use is a plate of steel of any convenient size and generally of uniform thickness, like a piece of common saw plate. An edge of this plate having been made straight or slightly curved, convexly outward is burnished on the edge with a piece of polished steel so as to raise a slight ridge or feathering on each corner as seen at $e$, $e$, and $e'$, $e''$, Fig. 1. Such plate is, when used to smooth off furniture, coach bodies, panelings and other work requiring to be brought to a smooth surface, usually held by the workman between the thumbs and fingers of his two hands, and with the top inclined from him is operated by pushing, while the lower inclined feathered corner scrapes the surface and removes the irregularities left by the plane. This mode of using the scraper is excessively fatiguing to the fingers and thumbs and without great strength cannot be long pursued, nor without great steadiness of hand can the work be made of uniform smoothness. To remedy these inconveniences, and to make the scraper a convenient and efficient tool I furnish the scraping plate A with a stock (B) in which it is set, and held fast by set screws (C) or other equivalent device. The stock-frame D is a little wider than the plate A, and the stock has a slot quite through it, allowing the plate to come above the upper edge, as well as to descend below the lower edge of the stock.

Figure 2:
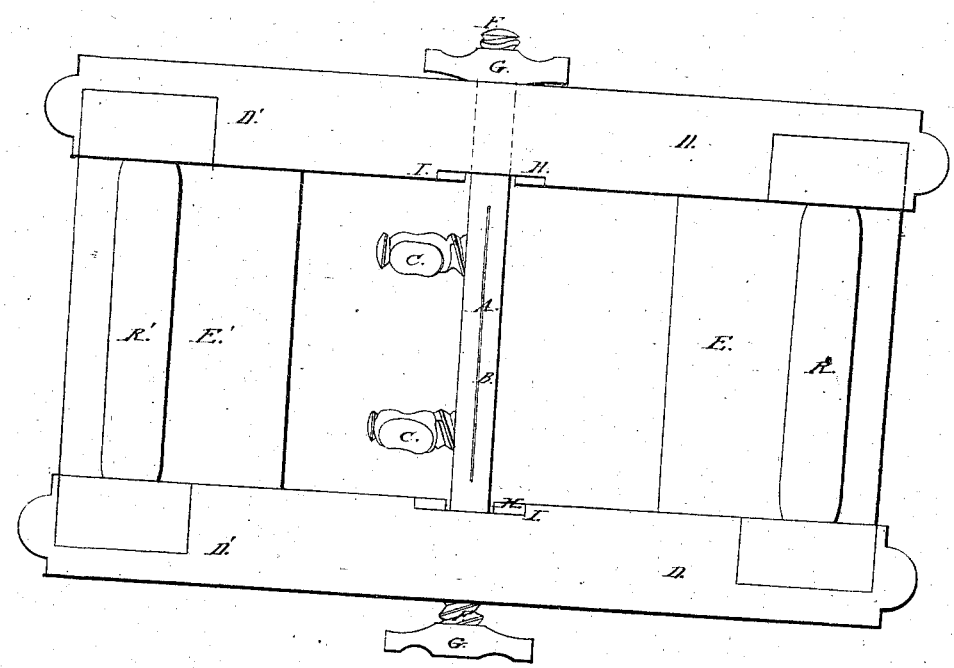

E, E', are cross pieces of the stock frame connecting together the side pieces D, D', D D' (Fig. 2) through which passes the axis F F of the scraper stock, having screws cut on the ends to receive the nuts G, G. Along the lower and inner part of the side pieces D, D, are offsets I, I, (Fig. 2) and in these are sloping cavities or notches H, H', within which the ends of the stock B are placed. The stock is thus capable of moving on its axis about one eighth of a revolution, more or less, and of being adjusted to any required angle of inclination to suit the work. This "notch" is also formed for the purpose of allowing the position of the stock and scraping plate to be reversed, so that instead of presenting the feather edge $e'$ to scrape the surface, that on the opposite corner, $e''$, may be brought into a position to work.

Figure 1:
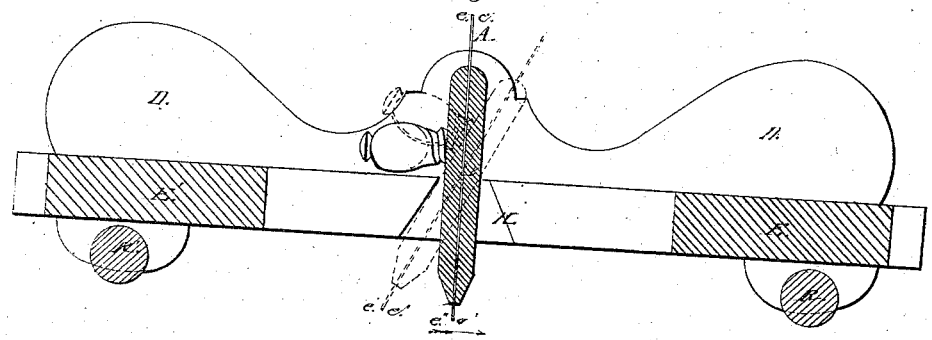

With the stock situated as seen in the dotted lines Fig. 1, the operator grasps the tool by the two handles D', and resting the other end of the stock frame on the friction roller R, brings the edge $e'$ in contact with the surface to be scraped and with a pushing force scrapes a thin film of the material from the surface to be smoothed.

The purpose of the nuts G, G, (Fig. 2,) is to fasten the stock temporarily in one or the other position with the degree of its inclination properly adjusted according as the feather edge $e'$ or $e''$ is intended to be used in scraping. When $e'$ is used the tool is pushed in the direction indicated by the arrow, and when B is reversed and brought toward a contact with the slope H, the operator takes the tool by the two handles D, D, and pushes in the direction opposite to that of the arrow, which brings the edge $e''$ into action, and the forward end then rests on the friction roller R'.

I shall sometimes make two or more sides of the scraping plate capable of acting as scraping edges as $e$, $e$, and $e'$ $e''$, and shall form the outline variously, either straight, convex or concave, so as to adapt it to either plane convex or concave surfaces or to moldings of any kind which I may desire to smooth. Nor shall I confine the use of this tool to smoothing the surfaces of wood, but shall also apply it wherever found applicable, to scrape the surfaces of leather, horn, ivory, soft metals or any other solid substances requiring to be smoothed.

The rollers R, R', prevent the scratching of the smoothed surface as well as guide the scraping edge. By the use of this roller the workman is relieved from the necessity of rubbing his hands upon the smoothed surface while sustaining the scraper as in the usual practice when holding it between his fingers.

What I claim as my invention and desire to secure by Letters Patent is—

1. The scraper stock set in a frame for holding and guiding the scraper so that the forward end only of the frame shall rest on the surface to be scraped and thereby enabling the workman to manage the tool with the whole hand, and apply a steady force, instead of using the fingers only as heretofore for that purpose.

2. I also claim reversing the position of the scraper stock and plate in the stock frame, whereby I am enabled to use both feather edges or corners of the plate successively without taking the plate from the stock as herein set forth.

HIRAM CARVER.

Witnesses:
WALTER R. JOHNSON,
JOHN B. STONER.